United States Patent [19]
Dugan

[11] 3,960,344
[45] June 1, 1976

[54] PRECISION MOBILE GRAVITY SURVEY AND GUIDANCE SYSTEM

[76] Inventor: Virgil H. Dugan, 1614 E. 47th St., Chattanooga, Tenn. 37407

[22] Filed: July 29, 1974

[21] Appl. No.: 492,789

[52] U.S. Cl. .............................. 244/182; 58/31; 73/178 R; 235/150.25; 235/150.271; 244/177; 324/4; 340/24
[51] Int. Cl.² .......................................... B64C 13/18
[58] Field of Search .............................. 58/29–32, 58/129, 158; 73/178 R; 235/150.25, 150.261, 150.26, 150.27, 150.271; 244/3.14, 14, 77 R, 77 B, 77 D; 318/649; 340/27 NA, 24; 324/4

[56] References Cited
UNITED STATES PATENTS

| | | | |
|---|---|---|---|
| 2,962,244 | 10/1960 | Harrison | 244/77 B |
| 2,996,268 | 8/1961 | Brown et al. | 244/77 B |
| 3,471,108 | 10/1969 | Corso | 244/77 B |

Primary Examiner—Stephen G. Kunin

[57] ABSTRACT

A gravity survey and aircraft guidance system comprises a pendulum clock mounted in an aircraft in level flight, having a pendulum bob with a signal sender mounted thereon. A signal receiver mounted in proxmity to the pendulum bob generates an electrical pulse at each pendulum swing. The pendulum swings in a plane having a component parallel to the east-west direction of spin of the Earth. The pendulum has a nominal oscillation frequency at a first aircraft speed with respect to the Earth's surface. The pendulum will have a second oscllation frequency at a second aircraft speed with respect to the Earth's surface due to the change in the Earth's spin-induced centrifugal force on the pendulum. Alternately, the pendulum will have a second oscillation frequency when the aircraft flies over a mass anomaly in the Earth's surface. A frequency discriminator connected to the signal receiver, generates a correction signal in response to changes in the oscillation frequency of the pendulum. In the aircraft guidance application, the control signal is applied to a servomotor to operate the aircrafts throttle, to compensate for speed variations of the aircraft. In the gravity survey application, the control signal is applied to a recorder to record the presence of mass anomalies.

8 Claims, 11 Drawing Figures

PRECISION MOBILE GRAVITY SURVEY AND GUIDANCE SYSTEM

FIELD OF THE INVENTION

The invention disclosed herein relates to gravity survey and aircraft guidance systems.

SUMMARY OF THE INVENTION

An object of the invention disclosed herein is to control the speed of an aircraft, in an improved manner.

Another object of the invention disclosed herein is to detect geophysical anomalies from an aircraft in flight, in an improved manner.

These and other objects, features and advantages of the invention are accomplished by the system disclosed herein. The gravity survey and aircraft guidance system comprises a pendulum clock mounted in an aircraft in level flight, having a pendulum bob with a signal sender mounted thereon. A signal receiver mounted in proximity to the pendulum bob generates an electrical pulse at each pendulum swing. The pendulum swings in a plane having a component parallel to the east-west direction of spin of the Earth. The pendulum has a nominal oscillation frequency at a first aircraft speed with respect to the Earth's surface. The pendulum will have a second oscillation frequency at a second aircraft speed with respect to the Earth's surface due to the change in the Earth's spin-induced certrifugal force on the pendulum. Alternately, the pendulum will have a second oscillation frequency when the aircraft flies over a mass anomaly in the Earth's surface. A frequency discriminator connected to the signal receiver, generates a correction signal in response to changes in the oscillation frequency of the pendulum. In the aircraft guidance application, the control signal is applied to a servomotor to operate the aircraft's throttle, to compensate for speed variations of the aircraft. In the gravity survey application, the control signal is applied to a recorder to record the presence of mass anomalies.

BRIEF DESCRIPTION OF THE DRAWINGS

These and other objects, features and advantages are more particularly described by reference to the accompanying drawings.

DESCRIPTION OF THE PREFERRED EMBODIMENT

An apparatus is disclosed to gauge the resultant velocity between the initial earth spin velocity and an airplane's in air ground speed, and to cause a servo-induction motor to automatically vary the craft's throttle to maintain constant the resultant velocity. This throttle control ensures that a practically fixed radial distance to the center of the earth will be kept, once the airplane has been positioned in flight and a survey begun.

The scheme will ensure that the Coriolis Force Limitation on Precision Mobile Gravity Surveys will very largely be overcome.

A powered pendulum clock riding on a Stabilized Platform, which is temperature stabilized, drives a series of cascaded frequency multipliers interspersed with an occassional amplitude amplifier. For Gravity or Geophysical Surveys a very high degree of mathematically precise magnification of minute gravity variations obtains with an expected sensitivity of better than 1 milligal.

A guidance tap with about 128 times less frequency multiplication gain than the gravity signal eliminates severe coupling problems.

With the extra gravity signal gain absent, the guidance section can keep an aircraft at practically a fixed radial distance from the center of the earth, but due to a considerable variability in the required in air ground speed, as distinguished from the resultant velocity, only a very high speed aircraft (1,410 to 2,000 mph etc.) would seen to justify said, special guidance system, except for surveys.

A theoretical and mathematical basis for this invention follows. The pendulum clock changes frequency smoothly, minutely, for small temperature shifts and for small changes in the distance to the center of the earth. Its frequency changes smoothly for changes in translational motion. The pendulum frequency is proportional to vellocity, but it is the resultant velocity of the earth spin and in air (or water) ground speed that is measured. An electric frequency discriminator, such as a Foster-Seeley, is highly sensitive to changes in its input frequency. Its input grid circuit may be tuned to a center frequency (such as 4,194,304 cps) and its output voltage is zero until the input frequency shifts. An output voltage that is positive or negative is then had and it is proportional to the degree of frequency change.

There is a marked analogy between a mobile pendulum and its associated circuitry and frequency modulation techniques. Any airplane or ship vibration superimposed upon the swinging pendulum at frequencies higher than the base pendulum frequency will result in phase flutter without a change in the pendulum frequency. Because of the discontinuous nature of all sidebands and the high degree of frequency multiplication they are dispersed outside the circuitry band passes. Even so, a special filter is used after the gravity signal discriminator to reduce to a flat form the results such as (the unexpected) significant vertical shifts of the aircraft. Servo-equipment response, proportional to the power supply frequency used, is chosen at 800 cps for this invention. For craft vibrations reaching the pendulum that are lower in frequency than the 1 cycle per second base frequency, frequency modulation principles apply. In Frequency Modulation (FM) an audio frequency modulation of the center frequency Fo produces a discontinuous side band. Fo $\pm f$; Fo $\pm 2f$; ... Fo $\pm nf$, where $f$ is the audio frequency and n is an integer. In FM the center frequency can disappear for B = $\Delta F/f$ = 2.4048 ... B = 5.200 ... etc. $f$ is the frequency swing. The frequency swing and so the number of side bands n, depends upon the amplitude of the modulation voltage. B is the modulation index. The degree of modulation cannot exceed $\Delta F/F = 1$. The vibration frequencies below the pendulum frequency should be considered as they are in FM, since it is evident that the amplitude of the modulating voltage in FM determines the number of side band frequencies, in the pendulum case, only one side band will obtain. The energy in the pendulum bob is so much greater than the energy in even a high amplitude vibration frequency that it cannot cause the pendulum frequency to disappear. A ½ cps vibration of 1/6th foot amplitude gives for the vibration acceleration, 1/12th ft per sec$^2$. This compares with g, the acceleration of gravity at 32.2 ft/sec$^2$, and is less than 1/386th as great.

The entire mass of the earth may be figured to be at earth's center. An airplane can be kept at a substantially constant distance from that center. Surveys will be made by flying by the laws of circular motion. The Airplane may be considered to be in a giant orbit at a distance R from the center of the earth. The distance around the orbit is: $S = 2\pi R$.

Suppose the craft to take on an increment in linear speed such that a new circumference is reached: $S + \Delta S = 2\pi R + 2\pi \Delta R$.

Subtracting the first expression from the second one gives: $\Delta S = 2\pi \Delta R$.

Radial or horizontal linear displacement can be expressed in terms of the respective accelerations, $\Delta S = \Delta \frac{1}{2} Ah$ T$^2$, where Ah the variable is the horizontal linear acceleration and T the time in which it takes place, and $2\pi \Delta R = 2\pi \Delta \frac{1}{2}$ Ar T$^2$, where Ar is the radial acceleration, and T the time in which it occurs. Because T applies to both expressions, we have: $\Delta \frac{1}{2}$ Ah T$^2$ = $2\pi \Delta \frac{1}{2}$ Ar T$^2$. Dividing both members by ½ T$^2$ gives $\Delta Ah = 2\pi \Delta$ Ar, or $\Delta/\Delta Ah/Ar = 2\pi$, a constant. Thus $dAh/dAr = k$, a constant; that is, both changes due to vertical position change and horizontal linear change (for guidance) ae covered by the apparatus provided, at the same time, so long as the conditions for flying by the laws of circular motion are met. This means that vertical position drifts are corrected by changes in the resultant velocity automatically, and very rapidly.

Other advantages and novel features of the invention will be seen from the following data.

Figure 1A:
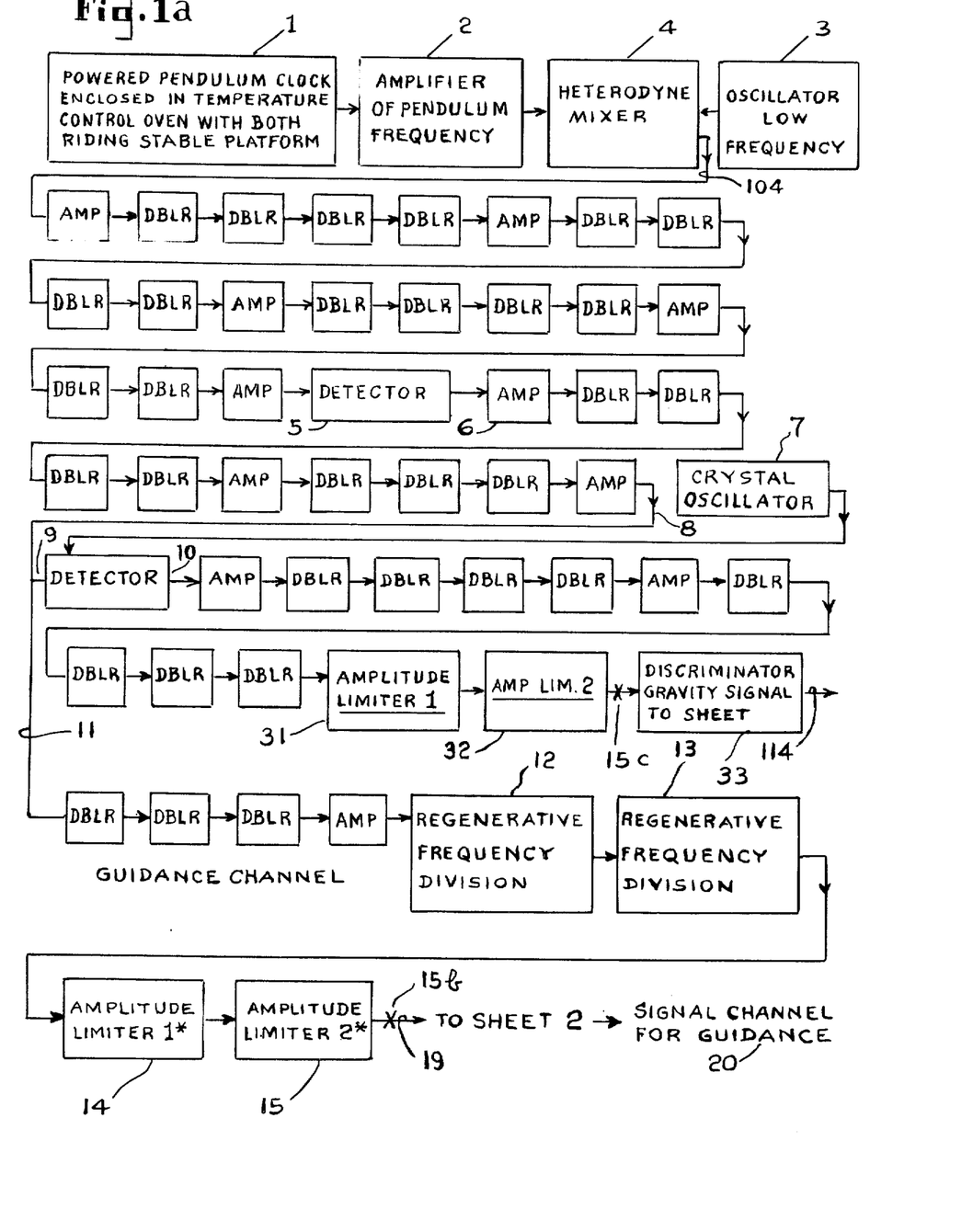
FIG. 1a is a block diagram showing the method of getting the precise magnifications of the guidance and gravity signals.

Referring now to FIG. 1a, which is a block diagram, a specific description of the airborne version of my invention follows:

From the swinging bob of the pendulum clock of 1, a 1 cps signal is induced into a circuit resonant to the pendulum frequency and it drives the grid circuit of amplifier 2. A 16,000 cps oscillator signal from oscillator, 3 is mixed hetrodyne mixer 4 with the 1 cps signal from amplifier 2. 4 is a heterodyning unit, the useful output of which is a 16,000 cps and a 16,000 $\pm$ 1 $\pm i$ cps, where $i$ represents the extremely weak variable component that arises from mass anomalies, etc. This weak component eventually becomes over 500 million times the frequency multiplication gain. Thereafter, as shown, doublers (dblr) and amplifiers (amp) are provided before 5, a detector, the input of which receives frequencies 262,160,384 $\pm$ $i$, and 262,144,000 cps, respectively.

The last of the two frequencies given results from the multiplication of the 16,000 cps oscillator output, due to the operation of the fourteen frequency doublers preceding detector 5. If said frequency had been separately multiplied in another channel and mixed with the higher of the two frequencies the result would have been the same. The self-heterodyning process gives the useful beat frequency of 16,384 $\pm i$ cps. It represents a mathematically exact multiplication gain. The 16,000 cps signal acts as a buffer and avoids the great difficulty of frequency multiplying of very low frequencies. Any drift in oscillator 3, cancels out. More doublers and amplifiers are further provided until the input of amplifier 8 is reached. A crystal oscillator 7 is used to further the gravity signal processing by mixing a reference signal in detector 10 with part of output of amplifier 8. The output of amplifier 8 goes to both the gravity channel including detector 10 and to the guidance channel 11. The guidance channel of FIG. 1a and 1b is comprised of elements 11 through 20, and the gravity signal channel of FIG. 1a is comprised of elements 10 and 31 through 33.

The output frequency of amplifier 8 is 2,097,152 cps. In the guidance channel there is shown 3 doublers and an amplifier followed by two stages of regenerative frequency division which provides the output to two amplitude limiters at 4,194,305 cps. At the input to the first frequency divider the frequency is 16,777,276 cps. The window of the frequency discriminator 20 is $\pm$ 100,000 cycles. Signals to the discriminator 20 which aircraft have vibration components, must be frequency multiplied outside the band pass of the circuitry, and thereby, rejected. The two extra doublers and the two stages of regenerative frequency division accomplish the desired rejection. The use of a minimum, 1/100th of a cycle per second craft vibration, and the assumption that no lower vibration frequency is to be expected, is based upon the fact reported in the literature that tests on an airplane on the ground and with 3-point support, registered vibration frequencies from 100 cps to 1/100th cps at amplitudes, overall from 0.1 g to 70 g, where g is the acceleration of gravity. An expression for the physical relationships is: $2S/t^2 = a$, where $a$ is vibration acceleration, and $t$ is the time period. If $a = 70$g, S = 0.1127 feet, or 1.3524 inches. If $f = 1/100$th cps, a 2 inch vibration gives: $a = 1/30,000$th ft per sec. 2 or about 0.0000333 g. As a discontinuous side band, with 16,777,216 times frequency multiplication (before the division) the 1/100th cps becomes 167,772 cps and misses by far, the discriminator window of $\pm$ 100,000 cycles. Referring again to the guidance channel of FIG. 1a, the two stages of amplitude limiters saturation amplifies all frequencies reaching it so that they all have the same amplitude. Thus signals passed to the discriminator (for guidance or gravity signal in the 2 signal channels) will give voltages that vary with frequency shift only.

Figure 1B:
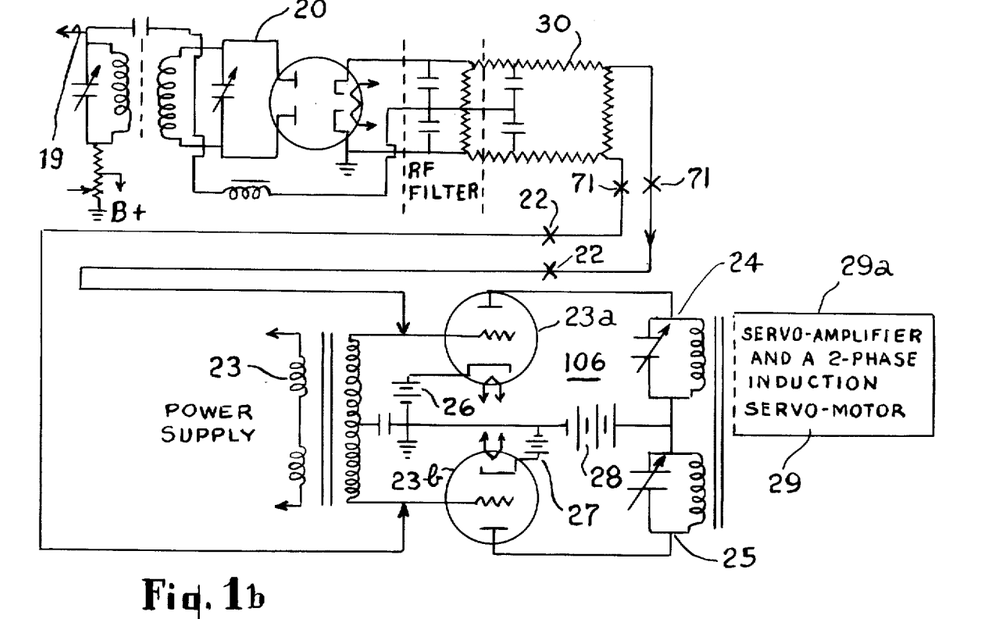
FIG. 1b is a continuation of the guidance signal channel to sheet 2. It is a circuit diagram and a block diagram.
Figure 7:
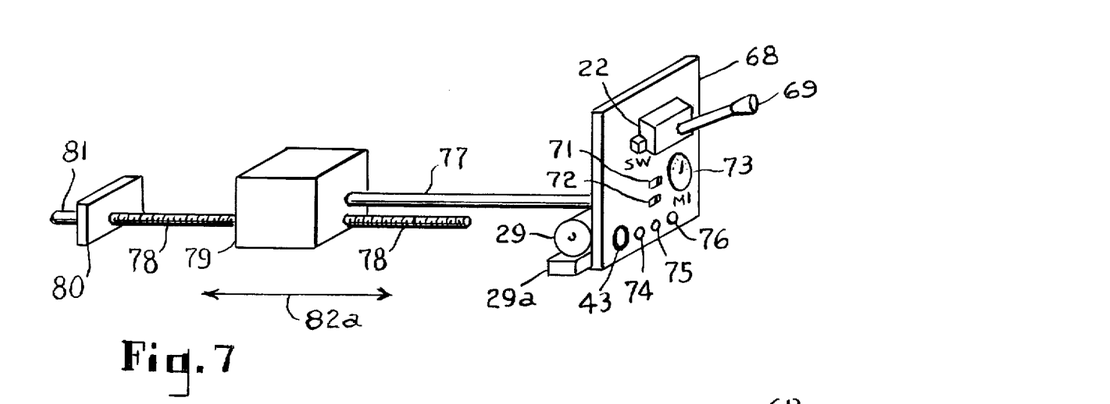
FIG. 7 gives a perspective view of a pilot's panel and some of the guidance parts; it is not to scale.

In FIG. 1b, the first switch 71—71, actually on the pilot's panel, as shown in FIG. 7, allows the pilot to keep a Galvanometer MI in FIG. 7, active while the auto-pilot is not in operation. The second switch 22—22, FIG. 1b, works via Sw, on the pilot's panel.

71—71 is to be used by pilot to zero in, or position the craft at the intended altitude and speed just before the auto-pilot guidance is switched on by Sw (22—22).

Returning now to the gravity signal channel at the output of amplifier 8. The crystal oscillator 7 is assumed to have a frequency of 2,103,152 cps. Actually the exact frequency would be hard to specify to that extent, so approximate values, which would change somewhat the remaining values given must be acknowledged. The outputs of 7 and 8 are detected in detector 10 and give a useful beat frequency of 6,000 cps. Because the to be recovered gravity recordings are extremely weak, it will be apparent that there is no danger of losing any amplitude in the final output. On the other hand, the degree of frequency multiplication figured, obtains despite the heterodyning of signals from detector 10. After detector 10, amplifiers and doublers are used to give to the 2 gravity signal amplitude limiters 31 and 32 a frequency of 1,536,000 cps. which drives discriminator 33. The latter's output filter is continued on sheet 2 in FIG. 1c. The total precision gain for the gravity signal is 536,870,912 times 128 times greater than the guidance signal gain. There should therefore be negligible clipping of the gravity signal, and the coupling of the guidance to the gravity signal eliminates the otherwise highly distorting coupling experienced by other systems.

Referring now to FIG. 1b, the output of amplitude limiter 15 is connected to the input of a guidance discriminator circuit 20. 30 is the guidance filter. It should be fast enough to accommodate the fast-acting servomotor response. The filter output goes to triodes 23a and 23b via switch 22 and 22 which is a switch located on pilot's panel, FIG. 7; which lets the Auto-Pilot be switched off or on. Preferably, 23 should be an 800 cps power supply voltage source, for a very fast servoresponse. Tubes 23a and 23b are biased to current cutoff by grid batteries 26 and 27 until discriminator 20 becomes positive at one or the other of the grids of 23a or 23b. Battery 28 is the plate supply for 23a and 23b. When the resultant craft velocity changes due to too high or too low a value, the proper tube furnishes a control error voltage to the servo-induction motor 29 which moves the throttle and corrects the speed. Motor 29 is to use an AC lead network, for stability. Switch 22—22 is actually a Sw, on the pilot's panel. When tube 23a or 23b get a positive voltage the 800 cps input signal causes the tube concerned to conduct and activate one of the resonant circuits 24 or 25; that drives servo-amplifier 29a. This control system differs from the standard one, and details are given later hereinafter.

Figure 1C:
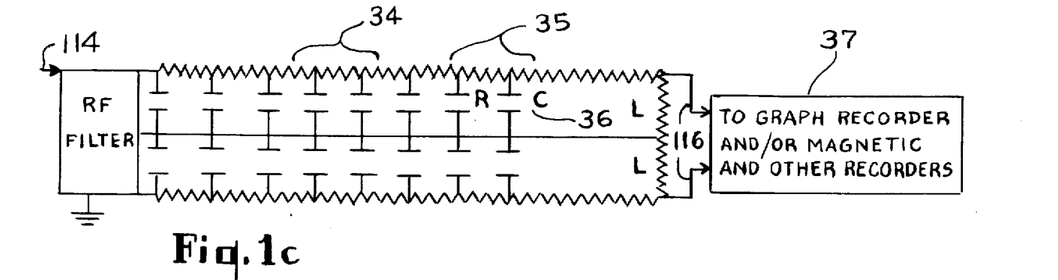
FIG. 1c is a continuation of the gravity signal to sheet 2. It is partly a circuit diagram together with a block diagram.

The discriminator 20 tuned input circuit sets the standard to which the guidance is referenced. When resonant circuit 24 or 25 is activated, the outputs will be displaced 180° in phase. Only one tube can conduct at a given time. The error voltages synthesized are proportional to the shift in resultant craft velocity. Therefore, this system duplicates the standard system with its larger number of parts and is considered unique for the purpose of controlling gravity survey or constant resultant velocity flights for planes or ships. Referring now to FIG. 1c, there is shown the termination of the gravity signal channel from 33. 34 is a low frequency filter for smoothing or flattening out any unexpected surge or altitude shift. It is true that all vibration frequencies figure to be dispersed out of the band passes of even the guidance channel, but hereinafter there is described the concept of anomaly frequencies and they will be very low frequencies. The 8-section RC Filter shown following the RF filter gives as much as $256 \times 10^8$ to 1 frequency discrimination against a 1/10 cps signal versus a 1/100th cps anomaly frequency. The number of R-C sections in the gravity filter 34 of FIG. 1c, can be reduced to yield a faster discharge time constant, should the distance $c$ in FIG. 4, between the flight path and the anomaly mass center, be substantially increased.

An advantage of the very fast charging, very slow discharging filter, 34, is that any momentary deviation of the pendulum base from a perfect level will be largely overcome. The best stable platforms can keep the platform essentially level. 35 and 36 are resistors and capacitors, respectively. L—L is the load resistance which could be 1 to 5 megohms. Adequate time constants can be had with little loss. In 37 a Graph Recorder for the gravity signal is indicated, having its inputs connected to the outputs of Filter 34. Magnetic and other recordings may be wanted. A Graph of any violet craft movements if synchronized with the gravity Graph may be useful. Amplitude amplification after Filter 34, — seems unnecessary.

Figure 2:
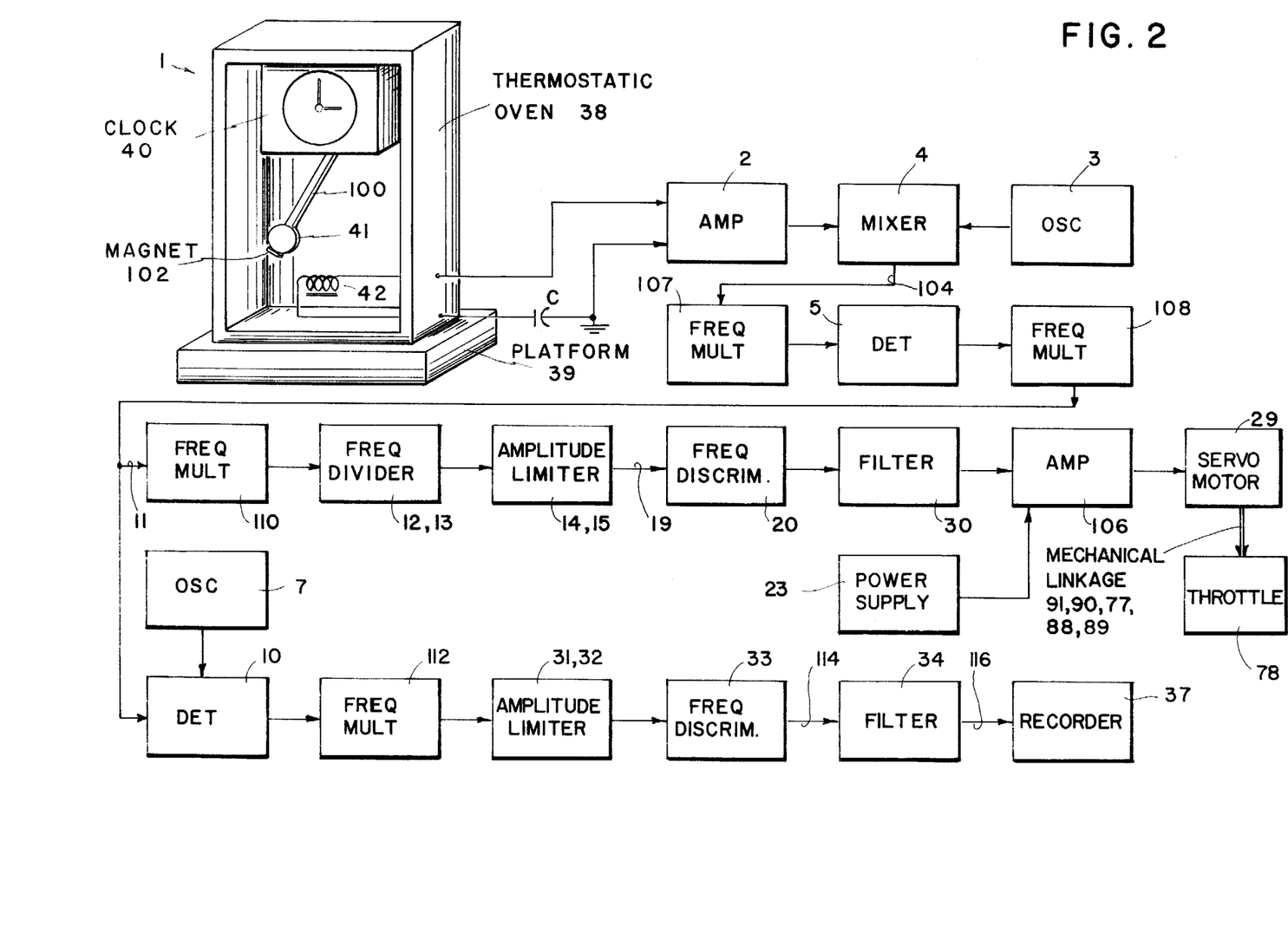
FIG. 2 illustrates the powered pendulum clock in a temperature controlled oven and other features.

FIG. 2, which is a block diagram of the system, also illustrates the structure of the clock assembly 1. A conventional stable platform 39 supports a conventional thermostatically controlled oven 38. Mounted within the oven 38 is a conventional high precision pendulum clock 41. The constant temperature maintained within the oven 38 insures that the length of the pendulum 100 for clock 40 remains constant which, in turn, enhances the precision of the timing of the clock. Attached to the bob 40 on the end of pendulum 100 is a magnet 102. As the pendulum 100 swings, the magnet 102 periodically passes within the vicinity of the coil 42, thereby inducing an electric current therein. With the pendulum 100 swinging at a nominal frequency of 1 cycle per second, a 1 cps electrical signal is outputted from the coil 42 to the input of the amplifier 2. The capacitor C and coil 42 form a resonant input circuit for the amplifier 2 with a resonant frequency of 1 cps. Other suitable resonant circuits will occur to those skilled in the art.

Amplifier 2 and oscillator 3 have their output signals mixed in the mixer 4, as previously described. The output line 104 from mixer 4 goes to the frequency multiplier 107 which is comprised of signal amplifications as shown in FIG. 1a. The output of multiplier 107 is inputted to detector 5 as previously described. The output of detector 5 is inputted to frequency multiplier 108 which is comprised of the seven frequency doublers and signal amplification as shown in FIG. 1a. The output of multiplier 108 branches into line 11 and into the input to detector 10. Oscillator 7 also has an input to detector 10, whose output goes to the frequency multiplier 112 Multiplier 112 is comprised of the eight frequency doublers and amplification shown in FIG. 1a. The output of multiplier 112 is inputted to the amplitude limiters 31 and 32, the output of which is connected to the frequency discriminator 33. The output line 114 from discriminator 33 is inputted to the filter 34 of FIG. 1c. The output of filter 34 is then inputted to the conventional recorder 37.

Figure 8:
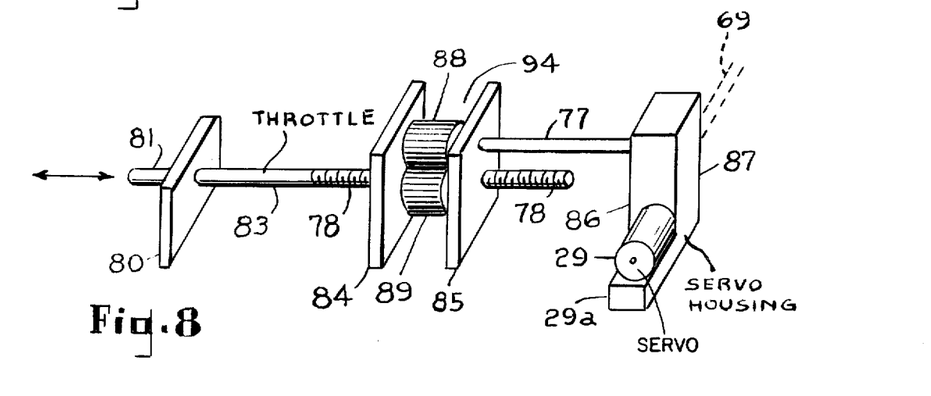
FIG. 8 shows some details of the guidance array.

The second branch of the output from frequency multiplier 108 is fed over line 11 to the frequency multiplier 110, which is comprised of the three frequency doublers and amplification in FIG. 1a. The output of multiplier 110 goes to the frequency dividers 12 and 13, the output of which goes to the amplitude limiters 14 and 15. The output thereof goes over line 19 to the frequency discriminator 20 of FIG. 1b. The output from discriminator 20 goes to the filter 30 and, in turn, to the amplifier 106 of FIG. 1b. The electrical output of amplifier 106 is applied to the servo-motor 29. The servo-motor 29 is mechanically linked to the throttle 78 as is shown in FIGS. 7 and 8.

The best gyroscope controlled equipment should be used. The platform and most of the parts referred to in FIG. 2 are well established in the art. 40 is a powered, mercury cup or special alloy pendulum clock 1 cps in this description. The kind suitable are expensive; ordinarily, they have good temperature control. At about $5.36 \times 10^8$ frequency multiplication gain there must be very accurate, further control.

Other schemes are possible for transducing the swing of pendulum 100 to an electrical pulse to be inputted to amplifier 2.

Figure 3:
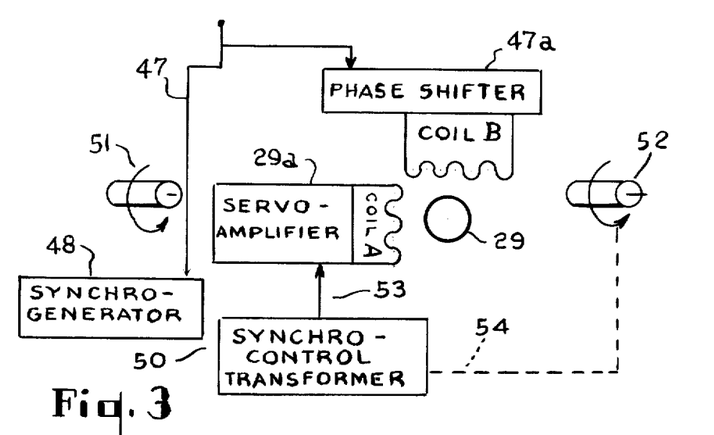
FIG. 3 is a schematic diagram of a synchro-generator, synchro-control transformer, and a 2-phase servo-induction motor, and servo-amplifier system.

Referring now to FIG. 3, a schematic diagram of a standard servosystem to which reference has been made, will now be covered. 47 and 47a indicate the 800 cps power supply system. 48 is the synchrogenerator (input angle 51); 29 is a 2-phase servo-induction motor with output angle 52 and 54. 50 is the control transformer and 53 shows the error signal to the servo-amplifier. For my system, only the parts 47a, 29, and the servo-amplifier, phase shifter, coils A and B are necessary because of the Special Error Signal synthesized in circuitry of FIG. 1b.

Figure 4:
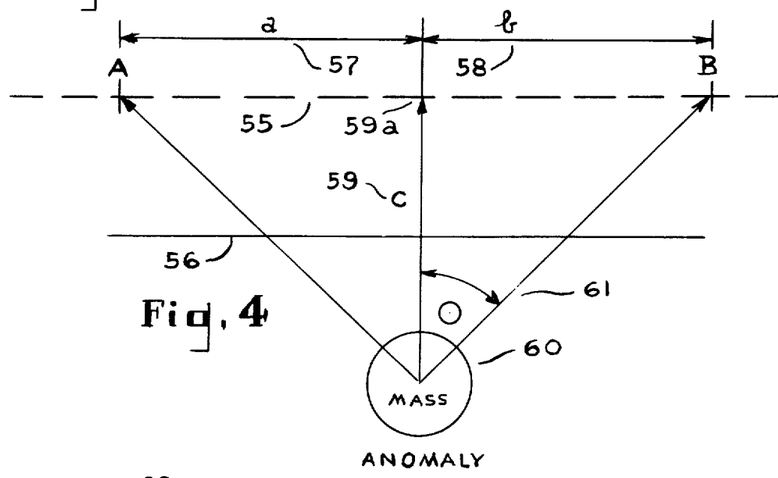
FIG. 4 illustrates some features of a gravity survey flight which are useful when flying over a mass anomaly or ore deposit.
Figure 5:
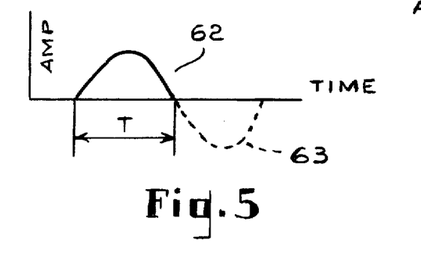
FIG. 5 illustrates a possible recording of an ore deposit.

Referring now to FIG. 4 which illustrates features of a gravity survey flight that is over a useful mass anomaly or ore deposit. There may be associated with flying over an underground anomaly (or mass variation in its density contrast and anomaly size to be picked up by graph recorder or other recorders) an anomaly frequency which is useful for the calculation of circuit filtering and in allowing estimates of depth of deposits to be made. It is in FIG. 4, assumed that the airplane is flying at 1,500 feet at 200 mph speed. 55 is the in air flight path. 56 is the ground. The distance B to A is 6 miles. $a = b$ and the angle 61 is 45°. Tangent of 45° = 1. Therefore, if the distance 59a to the center of the mass anomaly 60 is unknown, is also 3 miles = c, 59. There can be assumed an anomaly frequency such that the amplitude of a recorded graph at points directly under A and B are 0.707 times the maximum value. The inverse square law of gravitational attraction was disregarded but calculations with allowances for same may be made. The anomaly 60 is spherical. The depth is too much for most commercially attractive deposits. The time for passing, 100 seconds, gives an anomaly frequency of 1/100th sec. For filter calculations, the graph of FIG. 5, 62 and 63 shows that an anomaly time period of 200 seconds applies. Because of high damping, the 2nd half alternation is eliminated, 63. There are possibilities in estimations, but more involved cases would usually be expected.

One of my principal claims pertains to overcoming the Coriolis force limitation on precision mobile gravity surveys. Present airborne surveys are far too insensitive, and that waterborne surveys, though better, are too insensitive. Presently the aim is to fly to about ±1 mile per hour of constant and to keep to ±1 ft of constant altitude. The real difficulty is now analysed.

Figure 6:
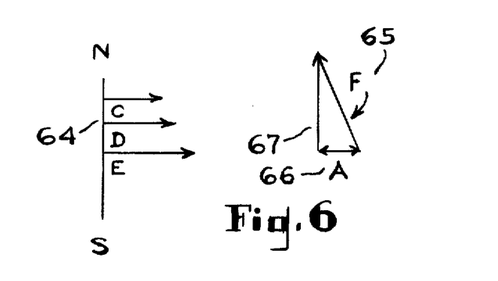
FIG. 6 is a diagram to illustrate how the Coriolis force limitation on precision gravity surveys is overcome.

Referring to FIG. 6 it will be shown that what is needed is to fly or sail a constant resultant velocity Vr between the initial earth spin velocity Vs and the initial in air or water ground speed Vg. If components of North-South motion are involved, the in air or in water speed must vary smoothly. This, in greatly exaggerated form, is indicated by 64 where the arrows E, D and C show that going north the earth spin velocity decreases or vice versa. Supposing a flight is flown due north. From time to time the pilot must steer slightly to the west of north and that cancels some of the spin speed component Vs represented by 66 at A. The flight path F, 65, shows that the ground speed component Vg must increase too. Actually, a plane or boat would dissipate excess spin velocity as a natural consequence of guiding by the Earth's surface. Going north, it will be seen, that Vs is excessive and going south it is too slow. In going north with an initial ground speed (in air) of 200 mph by the time 100 miles has been flown a 250 mph ground speed may be needed in latitudes where the spin velocity is considerable. For high velocity commercial aircraft guidance using this invention, if a flight due north begins at the equator with an initial in air ground speed component of 1,000 mph and Vr is equal to 1,410 mph, by the time the craft reaches the north pole, if the flight were continuous, there would be required a ground speed component Vg of 1,410 mph. If stops about 2,000 miles apart were made, there could, when resuming flight, be a rezeroing so as to divide the 410 miles into lesser amounts. As higher aircraft speeds are available, the situation improves. All the present version offers is to fly at essentially fixed distance from the center of the earth for long flights after being zeroed in, in air.

With reference to FIG. 6, it is now stressed that if a flight for gravity survey is flown due north starting at 200 mph and goes 100 miles, in a region where the Vs component is considerable, it may end with a Vg of 250 mph. This conclusively shows that the principal cause of poor accuracy airborne (or waterborne) gravity surveys stems from an effort to keep a constant air or water ground speed. The added 50 mph figured as needed by the principles of this invention is vital. It is true that if generally East-West surveys are made, smaller differences will arise, but the dependability of surveys that provide less sensitive gauging and coupling, and which ignore the real Coriolis force problem is lost. Certainly there can be no argument on flying an essentially constant Resultant Velocity Vr, since the speeding craft inherently tends to preserve that velocity.

An expression for the North-South, constant Vr is:

$$Vr = ((Vg \pm b)^2 + (Vs \pm a)^2)^{1/2},$$

and going north the sign before the Vg component is plus and that of the Vs is minus, and vice-versa for south travel.

In FIG. 1a, Discriminator 33 input circuit tuning, and in FIG. 1b, Discriminator 20 input circuit tuning, for a given altitude and speed, must be pre-tuned, and going East one tuning for zero voltage is necessary, and for the flight going West a different tuning is necessary. The resultant velocity Vr going West gives Vs −Vg equals 700 mph − 200 mph equals 500 mph when the spin and ground velocities are 700 and 200 mph respectively. Going East the values are: Vs + Vg = Vr and equals 900 mph for Vr.

Three separate tuned discriminator input circuits per range of altitude and speed are required using one for N-S, one for W-E and one for E-W. This means 3 tuned circuits for both discriminators 33 and 20 for each altitude-speed provided for.

It is necessary that only the best capacitors and inductors be used. Opposite temperature coefficient types, etc., double temperature control ovens might be used. Separate ovens for the pendulum clock and the other units could be provided too.

A mass anomaly of 2,000 ft radius with its center 4,000 ft beneath the surface, and with a density contrast of 0.25 grams per cubic centimeter, is an anomaly of 1-milligal. In airborne survey work, at a flight path of 1,500 ft above the earth there is figured to be recorded about 140 discriminator cycles change per milligal. Or 14 cycles per 1/10th milligal. Although unlimited further magnification is possible, it is to be pointed out that a 26 discriminator cycle shift per 1-vertical ft change in the distance to the center of the earth (static conditions). This is figured as follows:

The pendulum frequency is $f = 1/T$, where $T$ is the time period of the pendulum. $T = 2\pi (L/g)^{1/2}$ and L is the length of the pendulum; g is the acceleration of gravity. The force of gravity is $F = (GMm/R^2) = mg$, in which M is the mass of the earth considered to be at the center of the earth; R is the distance to the center, and G is a constant, therefore $$f = \frac{(g)^{1/2}}{2\pi(L)^{1/2}},$$

and since M is practically a constant it reduces to $f = K*/R = 1$ cps for one pendulum. Suppose the vertical position of craft is changed 1 foot. The Radius R is 20,926,467 ft. The change is 1/20,926,467th parts of R. The degree of frequency multiplication $5.36 \times 10^8$ gives about $5.36 \times 10^8$ over R in ft and gives a 26 cycle change. It is expected that R can be held to less than 1 foot. An expression for the pendulum frequency is: $f = K(g = Ac)^{1/2}$. Ac, the centripetal acceleration, is $-V^2/R$ where V is the resultant velocity. If the pendulum base makes an angle B with a level position, $$f = \frac{(g - Ac \cos B)^{1/2}}{2\pi(L)^{1/2}}.$$

In the above, g is the acceleration of gravity; K is a constant and $f$ decreases as Vr increases.

It is necessary that voltage and current regulation, shielding, and other precautions be observed, in the circuitry.

Referring now to FIG. 7, it is a perspective view of pilot's panel; 68 and some other guidance parts, not drawn to scale. On the panel, only parts necessary to my version of keeping an essentially constant craft resultant velocity are shown. The variations in air or watercraft throttle design calls for some flexibility in the adaptations to the throttle for this invention. Some restraints are to be found in throttles.

In FIG. 7, 69 is pilots's throttle. Safety considerations make it desirable that the gearings allow both pilot and auto-pilot coupling to be engaged at all times. That is, when on auto-pilot, the pilot's throttle tracks automatically. 71 is a switch that turns meter M1, 73 and a colored light 74, on or off. 72 is a switch that puts the semi-auto-pilot-gyro control and colored light 75 on or off. Via switch 22 puts auto-pilot control and colored light 76 on or off. A multi-section rotary switch 43 allows pilot to select the proper precision tuned discriminator input circuits in use before a survey or flight is begun. It also has an on - off provision controlling the power input to circuitry of FIG. 1a and 1b.

The other numbers in FIG. 7 are duplicated in FIG. 8, to which reference is now made. 69 is pilot's throttle. 29 is the servo-induction motor which obeys the error signals reaching it from the servo-amplifier 29a (with an 800 cps power supply its response may be as fast as 1/200th sec or better). 86 is the throttle drive from the servo-motor housed in housing 87. Box 77 turns gear 88 which in turn drives gear 89. The latter is a monkey-wrench-like screw drive that precision meshes 78, the threaded right end portion of throttle which at end 81–83 becomes unthreaded and is precision fitted in guide 80. Gear 89 is inside threaded. Plates 84 and 85 are inside box 79, FIG. 7. The gears 88 and 89 are precisely seated in plates 84 and 85.

Figure 9:
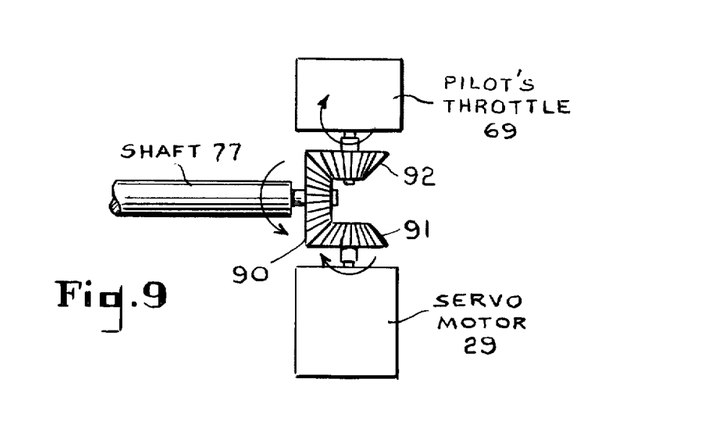
FIG. 9 illustrates the pilot's throttle mechanism.

Motor 29 is coupled to 91. Pilot's throttle 69 drives 92. 90 (via 77) drives throttle. See 82a, FIG. 7, where there must be allowed ample leeway to accommodate any to be encountered throttle shift. In FIG. 9, it is evident that the directions of the axles of 91 and 92 will turn the same way. This keeps it possible for pilot to move Sw, 22 and take over. The switch merely cuts off the voltage from guidance discriminator output, and inactivates servo-motor 29.

To zero the aircraft in for beginning an Auto-Pilot survey, the aircraft can be maneuvered to the approximate, pre-determined Altitude-Speed chosen, using the regular instruments. The Galvanometer M1 is all that should be needed once an approximate position is reached.

It is probably best to survey by comparatively long parallel flights which overlap, in the matter of effectively covering an area. An over move to allow reversing the plane for a return run is desirable. Of course, to specially investigate a promising spot or area, other routines apply.

The degree of frequency multiplication of the guidance or gravity signal or the frequency of the pendulum used are not inflexible. Some special considerations are necessary to adapt to watercraft use. In airborne or waterborne use the pendulum and its stable platform should be placed as close to the craft's center of gravity as is practical. The use of transistors for some of the circuitry can be made. Although a powered pendulum clock is described, any adaptation to other pendulums to produce the same results is claimed.

What I claim is:

1. An apparatus to precision gauge the resultant velocity between the earth spin velocity and an airplane's in air ground speed and to cause a servo- induction motor to automatically vary a speed control for the airplane to maintain said essentially constant the resultant velocity, said airplane being maintained at a practically fixed radial distance to the center of the earth, once the airplane has been positioned in flight; ensuring that the Coriolis force limitation on precision mobile gravity surveys will be substantially overcome; the apparatus further comprising a powered pendulum clock mounted on a stabilized platform and being temperature stabilized, for driving a series of cascaded frequency multipliers being interspersed with amplifiers; said pendulum oscillating at a clock frequency dependent upon said resultant velocity; the apparatus further comprising a guidance channel discriminator having an input connected to said series of cascaded frequency multipliers, to synthesize an error signal in response to variations in said clock frequency due to variations in said resultant velocity, to cause a servo-amplifier to control a servo-induction motor so that said motor manipulates said airplane speed control to hold said resultant velocity substantially constant; said apparatus further including a power supply having a power output connected to a two-triode push-pull amplifier, which triodes are biased to current cutoff; a first output of said guidance channel discriminator being connected to the grid of a first one of said triodes and a second output of said guidance channel discriminator being connected to the grid of a second one of said triodes; a signal output from said guidance channel discriminator to one of said triode grids causing the generation of an error signal to said induction motor to correct for a variation in said resultant velocity of the airplane.

2. An aircraft control system, comprising:
   a stable platform mounted in an aircraft flying at a fixed altitude;
   a pendulum clock mounted on said platform, having a pendulum with a bob at one end having a signal sending means mounted thereon;
   a signal receiving means located in a fixed position with respect to said platform and in close proximity to the path of said pendulum bob, for detecting the proximity of said sending means, and generating an electrical pulse in response thereto;
   said pendulum swinging in a plane having a component parallel to the east-west direction of spin of the Earth;
   said pendulum having a nominal oscillation frequency at a first aircraft speed with respect to the Earth's surface;
   said pendulum having a second oscillation frequency at a second aircraft speed with respect to the Earth's surface due to the resultant change in the Earth's spin-induced centrifugal force on said pendulum;
   a frequency discriminating means connected to said receiving means for generating a correction signal having a magnitude that is a function of the difference between said nominal oscillation frequency and said second oscillation frequency;
   a servo-motor having an input connected to said discriminating means, for generating a mechanical displacement in response to said correction signal;
   a speed control means connected to the propulsion means for said aircraft, having a mechanical input connected to the output of said servo-motor;
   whereby, variations in the speed of the aircraft with respect to the Earth's surface can be compensated for by changing the propulsion of the aircraft by said propulsion means.

3. The apparatus of claim 2, wherein said sending means is a magnet and said receiving means is a coil.

4. The apparatus of claim 2, wherein said frequency discriminating means further comprises:
   means for causing said nominal frequency to differ from said second frequency by an incremental frequency;
   a first hetrodyne mixer having a first input connected to said receiving means;
   a first oscillator having an output to said first mixer;
   said first mixer generating beat frequencies as a function of said incremental frequency;
   a first frequency multiplier having an input connected to the output of said first mixer;
   a self hetrodyning detector having an input connected to said first multiplier;
   said detector generating second beat frequencies as a function of said incremental frequency;
   a second frequency multiplier having an input connected to said detector;
   an amplitude limiter having an input connected to the output of said second multiplier;
   a frequency discriminator having an input connected to said limiter, for generating said correction signal as a voltage signal when said second beat frequencies, after having been multiplied by said second multiplier, have a frequency within a predetermined range.

5. The apparatus of claim 4, which further comprises:
   a recording means connected to the output of said second frequency multiplier, for recording said aircraft speed variations.

6. The apparatus of claim 5, wherein:
   said servo-motor is rendered non-responsive to said correction signals;
   said aircraft speed is held constant with respect to the Earth;
   and said recorder records variations in said pendulum frequency as a function of geophysical mass anomalies.

7. The apparatus of claim 4, where said frequency discriminator further comprises:
   a tuned frequency discriminator circuit having an input connected to the output of said amplitude limiter, for generating an output signal in response to the receipt of an input signal frequency within a pre-selected frequency band;
   a push-pull amplifier having an input connected to the output of said tuned frequency discriminator, and an output connected to said servo-motor, for generating a correction signal to said servo-motor in response to the receipt of said output signal from said tuned discriminator.

8. The apparatus of claim 2, wherein said pendulum is maintained at a constant temperature in a thermostatically controlled oven.

* * * * *